Figure 1:
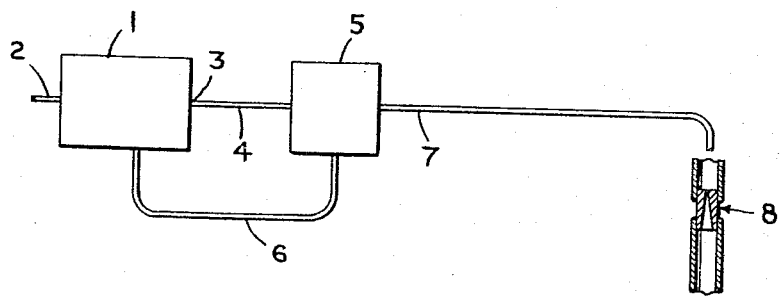

May 9, 1967  R. O. GARBUS  3,318,514
MINIMUM DISCHARGE PRESSURE REGULATOR FOR ROTARY COMPRESSORS
Filed Nov. 30, 1965

RICHARD O. GARBUS
*INVENTOR.*

BY Daniel H. Bobis
*Atty*

3,318,514
MINIMUM DISCHARGE PRESSURE REGULATOR FOR ROTARY COMPRESSORS

Richard O. Garbus, Springfield, Mass., assignor to Worthington Corporation, Harrison, N.J., a corporation of Delaware
Filed Nov. 30, 1965, Ser. No. 506,070
2 Claims. (Cl. 230—206)

This invention relates generally to fluid carrying systems in which compressible fluids, such as gases, are being carried at pressures in excess of atmospheric pressure, and more particularly, to a control device in combination with the fluid carrying lines in such systems for maintaining the line pressure.

In a system for carrying compressible fluids, e.g. gases, at pressures in excess of atmospheric, such a rotary compressor in combination with a discharge line, one of the essential control devices is a minimum pressure valve in the discharge line before the final delivery outlet.

This valve is required to have two operating characteristics.

First, it must have a low pressure drop, say less than 5 p.s.i. (pounds per square inch) for normal operating conditions, to prevent excess power consumption. The normal operating conditions include variations in the rate of fluid usage by the devices in the system downstream of the valve, which are using the pressure fluids. This mode of operation depends upon there being enough total restriction in these devices to maintain the system downstream pressure above a desired minimum.

When the system downstream pressure drops off below the desired minimum as a result of reducing the downstream restrictions, an abnormal operating condition exists. Under this condition, the minimum pressure valve in the discharge line must prevent the discharge pressure of the compressor, upstream of the valve, from going below a desired minimum value; even though the downstream pressure drops off to atmospheric.

In the prior art, valves which exhibited a low pressure drop under normal operating conditions, and which maintain a minimum upstream pressure under abnormal downstream pressure conditions, often consisted of many different parts including such things as springs, pistons, seals, seats, etc., in a relatively complex configuration. In addition, auxiliary piping was needed in order to incorporate the valves into the discharge line.

This multiplicity of parts tended to make such valves unreliable.

They were, therefore, costly items: (1) to buy, because of their complexity; (2) to install, because of the attendant fittings; and (3) to maintain, because of their unreliability.

The present invention provides a substitute for the minimum pressure valve in the discharge line of pressure fluid systems, which substitute gives the desired operating characteristics of the valve, but with a marked reduction in cost and improvement in reliability.

This invention comprises a venturi in the discharge line which:

(1) is of unitary construction, having only one part and no moving parts;
(2) replaces the valve and its fitttings; and
(3) is relatively inexpensive and maintenance free.

Accordingly, it is an object of this invention to provide a pressure control device of unitary construction for use in the discharge line of a system carrying compressible fluids, e.g. gases, at pressures in excess of atmospheric, to maintain the upstream pressure above a desired minimum value, when the pressure downstream of the control device drops off below a desired minimum value, which device causes a relatively low pressure drop in the discharge line under normal operating conditions, and which is reliable and inexpensive to buy, install, and operate.

It is another object of this invention to improve the dependability and lower the cost of rotary gas compressor systems by providing as a substitute for the minimum discharge pressure valve in such systems, a venturi device which will maintain the upstream pressure above a predetermined value, when the downstream pressure drops below a predetermined value, which venturi device exhibits a relatively low pressure drop under normal operating conditions, and which device is reliable and inexpensive to buy, install, and operate.

Figure 2:
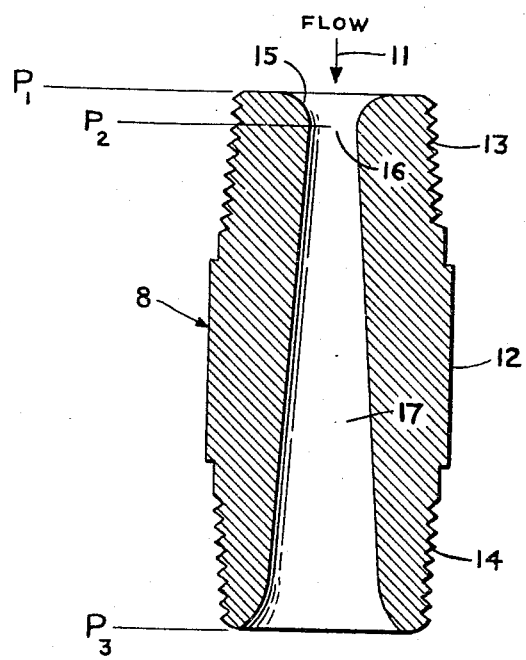

Other objects and advantages of this invention will become evident from the following description with reference to the accompanying drawings in which:

FIGURE 1 is a diagrammatic sketch of a gas compressor system with a minimum discharge pressure regulator in the discharge line; and FIGURE 2 is a detail drawing of one embodiment of the regulator.

Referring to the drawings, FIGURE 1 shows a compressor, e.g. a rotary gas compressor 1, with an inlet 2 and a discharge outlet 3. This discharge outlet is connected by means of a discharge line 4 to an oil-air separating tink 5. Oil is returned to the compressor from this tank by means of return line 6. The oil-air separating tank discharges compressed air downstream through the system through line 7, which contains an in-line regulator 8. Downstream of this regulator are the various devices (not shown) which utilize the compressed air in the system, and are restrictions in the discharge line 7.

One function of the regulator 8 is to prevent the discharge pressure upstream from going below a desired minimum value even thouh the final delivery outlet pressure is reduced to atmospheric. In addition, the regulator is designed so as to have a low pressure drop for normal operating conditions to prevent excess power consumption.

An embodiment of the regulator 8 is illustrated in more detail in FIGURE 2, wherein the direction of fluid flow is indicated by the arrow 11. The regulator itself, which is of unitary construction, consists of a cylindrical body 12, threaded externally at both ends with standard pipe threads 13 and 14.

This external configuration permits the regulator to be easily installed at any convenient place in the discharge line.

The internal configuration is basically that of a venturi, which consists of a converging portion 15, a throat 16 and a diverging portion 17.

The throat size is calculated for each compressor, and is based on the condition of sonic flow at the throat with the desired upstream pressure $P_1$ as shown in FIGURE 2 and the known flow rate of the compressor. This is a standard calculation and requires no further explanation.

The configuration of the converging portion and the throat results in an operating condition such that the upstream pressure $P_1$ will not fall below the desired minimum value even though the pressure at the outlet, designated as $P_3$, is reduced to atmospheric pressure. Thus the venturi device meets the second operating characteristic, i.e., it prevents the discharge pressure of the compressor upstream of the venturi device from going below a desired minimum value even though the outlet pressure downstream of the venturi device is reduced below a desired minimum value.

This characteristic is a protective function in the upsteam part of the system, in that the minimum value of $P_1$ is that which must be maintained in the oil-air separating tank 5 to insure the necessary flow of lubricating oil in the return line 6 to the compressor 1 (FIGURE 1).

The addition of the divergent cone 17 after the throat 16, allows the venturi type device to meet the first operating characteristic, i.e. minimum pressure drop across the regulator under normal operating conditions. The maintenance of normal operating conditions depends upon there being enough total restriction in the downstream devices using the compressed air to raise the outlet pressure $P_3$ above the minimum desired, and kept it there. Under such conditions the pressure at the throat $P_2$ will be lower than either the upstream pressure $P_1$ or the outlet pressure $P_3$. The pressure difference $(P_3-P_2)$ will have a positive value which will be nearly as great as the negative value of the pressure loss $(P_1-P_2)$.

In other words, $(P_1-P_2)+(P_2-P_3)$ equals $(P_1-P_3)$ equals a relatively small positive pressure drop in the system.

These properties of a venturi are described in standard texts in this field.

This venturi type device can be easily made or bought to the desired specifications. Its simple unitary construction makes it inexpensive to buy or make, and relatively maintenance free in comparison with a valve.

It will be understood that various changes in the details, materials and arrangements of parts which have been herein described and illustrated in order to explain the nature of the invention, may be made by those skilled in the art within the principle and scope of the invention, as expressed in the appended claims.

What is claimed is:

1. In a compressible fluid pressure system including, a compressor, a discharge line connected downstream of said compressor, an oil-gas separating tank in said discharge line, an oil return line connecting said tank to said compressor, the combination therewith of a venturi means in said discharge line downstream of the oil-gas separating tank for controlling the upstream pressure above a predetermined value when the pressure downstream of said venturi means drops below a predetermined value, and maintaining the pressure drop across the venturi means below a predetermined value under normal system operating conditions.

2. An apparatus as in claim 1 wherein, said venturi means is of unitary construction having a converging and a diverging portion, said converging portion terminating in a throat and connected in the discharge line at the upstream side of the venturi means for maintaining the discharge pressure upstream of said venturi means above a predetermined value, when the pressure downstream of said venturi means drops below a predetermined value, and said diverging portion connected to the discharge line at the downstream side of the venturi means for mantaining the pressure drop across said venturi means below a predetermined value under normal system operating conditions.

References Cited by the Examiner

UNITED STATES PATENTS

| 2,525,624 | 8/1941 | Gilmore | 230—207 X |
| 2,790,463 | 4/1957 | Delano et al. | 138—44 |
| 2,934,094 | 4/1960 | Szydlowski | 230—114 X |

FOREIGN PATENTS

| 484,862 | 8/1958 | Great Britain. |
| 900,989 | 7/1962 | Great Britain. |

References Cited by the Applicant

UNITED STATES PATENTS

| 1,802,766 | 4/1931 | Kerr. |
| 2,229,119 | 1/1941 | Nichols et al. |
| 2,670,011 | 2/1954 | Bertin et al. |
| 2,704,555 | 3/1955 | Dall. |
| 2,752,077 | 6/1956 | Lung. |
| 2,790,463 | 4/1957 | Delano et al. |
| 3,146,789 | 9/1964 | Chenault. |

DONLEY J. STOCKING, *Primary Examiner.*

W. L. FREEH, *Assistant Examiner.*